(12) United States Patent
Flatt (10) Patent No.: US 6,643,436 B2
(45) Date of Patent: Nov. 4, 2003

(54) IDENTIFYING FIBERS OF FIBER OPTIC CABLES

(75) Inventor: David William Flatt, Gower (GB)

(73) Assignee: Radiodetection Limited, Bristol (GB)

( * ) Notice: Subject to any disclaimer, the term of this patent is extended or adjusted under 35 U.S.C. 154(b) by 0 days.

(21) Appl. No.: 10/013,801

(22) Filed: Dec. 10, 2001

(65) Prior Publication Data

US 2002/0076176 A1 Jun. 20, 2002

Related U.S. Application Data

(60) Provisional application No. 60/268,633, filed on Feb. 14, 2001.

(30) Foreign Application Priority Data

Dec. 14, 2000 (GB) .............................................. 0030549

(51) Int. Cl.[7] ............................ G02B 6/28; G01N 21/00
(52) U.S. Cl. ................. 385/100; 250/227.14; 356/73.1; 356/926; 385/15; 702/122
(58) Field of Search .......................... 385/15, 100, 147; 356/73.1, 926; 702/117, 118, 122; 250/227.14–227.18

(56) References Cited

U.S. PATENT DOCUMENTS 5,142,141 A * 8/1992 Talat et al. ............ 250/227.15
5,384,540 A * 1/1995 Dessel ......................... 324/539
5,410,401 A * 4/1995 Shofner et al. ............. 356/238
5,506,674 A * 4/1996 Inoue et al. ............... 356/73.1
6,259,993 B1 * 7/2001 Hori ............................. 702/30

FOREIGN PATENT DOCUMENTS

DE        44 41 599        11/1994

* cited by examiner

*Primary Examiner*—John D. Lee
(74) *Attorney, Agent, or Firm*—Baker & Hostetler LLP (57) ABSTRACT

A method of and apparatus for identifying fibers of fiber optic cables is disclosed. Waveforms may be generated by integer subdivision of a clock, the waveforms for modulation of a laser beam into a set of unique signals. Preferably, however, each waveform has two states and a different integer X associated therewith. The repeat period of the waveforms is preferably set at 2Y cycles of the clock, Y being an integer greater than the highest value of X, and the waveforms can be generated by counting X mod Y and changing the state of each waveform whenever this counting reaches or exceeds Y. The signals may be applied either successively or simultaneously to individual fibers at one end of a fiber optic cable. At another end of the cable, each signal can be detected as having a frequency by taking a Fourier Transform; the frequencies detected preferably being in arithmetic progression, whereby each fiber can be identified individually.

26 Claims, 6 Drawing Sheets

IDENTIFYING FIBERS OF FIBER OPTIC CABLES

CROSS REFERENCE TO RELATED APPLICATIONS

This application claims the priority of GB 0030549.0 filed on Dec. 14, 2000 and U.S. Provisional Application No. 60/268,633 filed on Feb. 14, 2001 now abandoned and entitled "Identifying Fibers of Fiber Optic Cables" by David William Flatt, the entire contents and substance of which are hereby incorporated in total by reference.

BACKGROUND OF THE INVENTION

1. Field of the Invention

This invention relates to the identification of fibers of fiber optic cables. Typically a fiber optic cable comprises many individual fibers. Typically a fiber optic cable extends for several kilometers between regeneration stations which boost the signals travelling down the cable.

2. Summary of Prior Art

If a fiber optic cable is broken, for example by excavation, the cable operating company will want to re-connect the cable as soon as possible. This will involve re-connecting the many individual fibers in the length of broken cable on a first side of the break with the many individual fibers in the length of broken cable on a second side of the break. This needs to be done correctly so that each individual fiber in the first length of broken cable is re-connected to the corresponding individual fiber in the second length of broken cable. (For each fiber in the first length of broken cable the corresponding fiber in the second length of broken cable is the one which was originally part of the same fiber before the cable was broken). The fibers are typically hard to distinguish from each other, so matching and reconnecting the corresponding fibers is a difficult job.

A method of matching the corresponding fibers exists in which an optical signal (in the form of a modulated laser beam) is transmitted down one of the fibers in the first length of broken cable. The signal is transmitted from the end of the fiber at a regeneration station, which is typically some distance from the break, to the end of the fiber at which the break occurred. A handheld receiving device is then used to find the presence of this signal in one of the fibers amongst the bundle of fibers at the break. The procedure is then repeated on the second length of broken cable by sending a signal down the corresponding fiber in the second length of broken cable and using the receiving device to find the signal in one fiber from the bundle of fibers at the break. The broken ends of the fibers identified by the optical signals are then reconnected. It is possible to locate the corresponding fibers at the regeneration stations because all the fibers are still connected there, but it is difficult without this method to match the corresponding fiber ends at the break. The above procedure is carried out for each fiber in turn. An operator is required to change the transmitter onto each fiber in turn at both regeneration stations and to identify and rejoin the fiber ends at the break. This method is time consuming and is prone to error.

SUMMARY OF THE INVENTION

Therefore, at its most general, the present invention proposes that signals of different frequencies are input to respectively different fibers, so that each fiber has a unique waveform (frequency signal) thereon. The inputs fed to one end of the fibers are detected at another end of the fibers (e.g. at a break). Since each fiber has a unique signal, it is possible to determine at the detection end which fiber is which, thus identifying the respective fibers. The signals may be applied to the fibers successively or simultaneously.

For practical purposes, it is desirable that the signals input to the fibers are generated from a common source. This could be achieved by generating a clock signal, which is subdivided by successive integers to produce a series of frequency signals subdivided by successive integers to produce a series of frequency signals.

At the detector, it will normally be necessary to perform a Fourier Transform on each signal, to determine its frequency, usually by taking a series of samples of the signal. However, if the computations of the Fourier Transform are to be efficient, it is desirable that the frequencies being analysed represent an arithmetic progression, so that they are in the sequence 1, 2, 3 . . . multiplied by an appropriate constant. However, this creates conflicting requirements at the transmitter and the detector, because if such a sequence of signals is to be received at the detector, and if those signals are produced by integer subdivision of a master clock, the clock frequency must be very high if a large number of signals are to be produced. Thus, for example, if five signals are to be produced in the sequence 1, 2, 3, 4, 5, the master clock must be divided by 60 to produce the first, 30 to produce the second, 20 to produce the third, 15 to produce the fourth and 12 to produce the fifth, and a very high number would be needed to produce more signals. Since a cable will have many fibers, impractically high clock frequencies may be needed. The alternative to such a high clock frequency if integer subdivision is used, is to compromise the computations of the Fourier Transform at the detector end.

Therefore, it is desirable for the signals applied to the different fibers to be generated in a way which permits them to have an arithmetic progression of frequencies, but to produce them without integer subdivision of a master clock signal. A development of the present invention seeks to achieve this and proposes that clock cycles are counted in groups of X at modulus (or base) Y. Then, each time a count of X results in the modulus Y being reached or exceeded, the state of the output signal is changed. X is an integer which is less than Y and which may then be different for each waveform, so that a set of integers $X_n$ are used to generate the waveforms and can be made to be members of an arithmetic progression by suitable selection of $X_n$ and Y. The waveforms will have a repeat period equal to 2Y.

To understand this invention, consider the simple case where Y is 10 and the values of X for three signals are 4, 6 and 8. If, each time the signal passes 9, (0 to 9 forming the set of Y integers) the value of the output signal is changed, the effect is to generate three signals with frequencies which are in the arithmetic progression 2, 3, 4. That is achieved because the mark ratio of the signals is not 50/50, but instead has a small variation within the signal and from one signal to the other. However, when the resulting signals are sampled and then analysed by Fourier Transform, the effect of that variation is eliminated. Thus, it is possible to generate an arithmetic progression of frequency signals using a smaller clock frequency than would be necessary if signals were to be produced by integer subdivision.

If signals are produced whose frequencies are an arithmetic progression, and those signals are then applied to respective fibers of an optical fiber, a detector using Fourier Transforms can operate efficiently, and therefore quickly. The signals produced may thus have a common repeat time, and the number of cycles of each waveform in that time is equal to the number of cycles which would have been undergone by a square wave signal of the same frequency having a 50/50 mark space ratio. However, as mentioned above, the signals produced by this development of the present invention do not have a 50/50 mark space ratio but their frequencies still correspond to such signals.

In this development of the present invention, the detector will need to sample the signals for a period of time that is the repeat period of the transmitted waveform, or multiples of it.

In practice, although the example of this development of the present invention mentioned above used values of Y=10 and values of X=4, 6 and 8, the numbers used in a practical device will be higher. The reason for this is to permit a suitably large range of frequency signals. For example, if Y is 131072, $X_n$ may be 256, 257, 258 . . . 511.

The signals may be produced by generating light from a laser or LED, and then modulating that light using a modulator or modulators operating to generate light signals having variations based on the principles discussed above. If the light is to be applied successively to the fibers of the cable, then a single modulator may be used with the modulation frequency changing, or multiple modulators may be used modulated at different frequencies for simultaneous arrangements. Whilst it is normally convenient for that modulation arrangement to be permanently installed at a suitable location on the cable, it may be possible to provide a device which can be positioned on the cable when needed.

The present invention relates to a method of identifying fibers of a cable as discussed above, and also to an apparatus for carrying out such a method. In such an apparatus, an accumulator or register of size Y may be used so that the state of the respective signal is changed each time that accumulator or register overflows. Since the register or accumulator operates on digital principles, it is convenient if Y is a power of 2.

There may also be provided a method of generating a set of waveforms for modulating physical signals, said waveforms approximating pure tones, the frequencies of said pure tones being members of an arithmetic progression, the method comprising the following steps:

a) establishing a clock cycle b) defining a repeat period for the waveforms, the repeat period being equal to 2Y cycles of said clock and being the same for each waveform c) for each waveform counting X modulus Y at each clock cycle and changing the state of said waveform each time Y is reached or exceeded, X being an integer which is less than Y and which is different for each waveform, the set of integers X used to generate said waveforms being composed of members of an arithmetic progression.

The signals are then applied to an optical fiber cable with each signal applied to a different fiber.

There may also be provided apparatus for generating a plurality of modulated optical signals comprising a) a clock for establishing a clock cycle b) light generating means for generating a plurality of optical signals c) modulation waveform generating means regulated by said clock for generating a plurality of modulation waveforms d) modulating means for modulating said plurality of optical signals generated by said light generating means with said plurality of modulation waveforms generated by said modulation waveform generating means;

said waveform generating means being configured to generate said plurality of waveforms by i) defining a repeat period for the waveforms, the repeat period for each waveform being equal to 2Y cycles of said clock ii) for each waveform counting X modulus Y at each clock cycle and changing the state of said waveform each time Y is reached or exceeded, X being an integer which is less than Y and which is different for each waveform, the set of integers X used to generate said waveforms being composed of members of an arithmetic progression. Again, the signals are applied to respective fibers of an optical fiber cable.

The waveform generating means may have a plurality of adding means, a plurality of accumulators of size Y, a plurality of overflow detecting means and a plurality of waveform output means for outputting a plurality of waveforms. Each adding means may then be linked to a respective accumulator and configured to add a given integer X to said accumulator every clock cycle, a different given integer X being used by each adding means, the set of integers X, used by said plurality of adding means being composed of members of an arithmetic progression. Each respective accumulator is then linked to a respective overflow detecting means, and each respective overflow detecting means is linked to a respective wave output means. Then the respective overflow detecting means can detect when the accumulator to which it is linked overflows and communicate this to the waveform output means to which it is linked. The waveform output means can then change the state of the waveform, which it outputs each time the overflow detecting means to which it is linked communicates that an accumulator has overflowed.

BRIEF DESCRIPTION OF THE DRAWINGS

In order that the invention can be better understood an embodiment will now be described by way of example, with reference to the accompanying drawings in which.

DETAILED DESCRIPTION

Figure 1A:
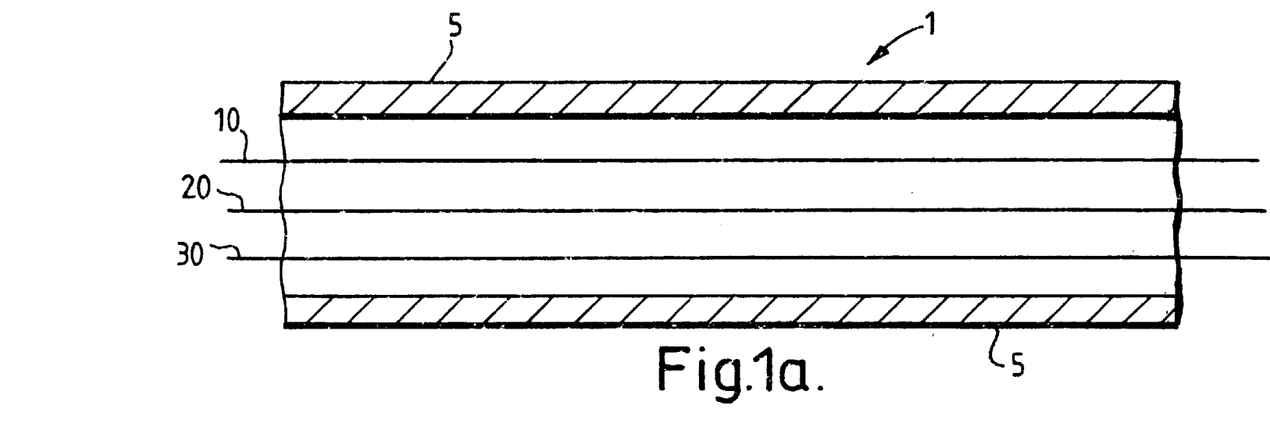
FIG. 1a is a longitudinal cross section of a fiber optic cable and its constituent fibers.
Figure 1B:
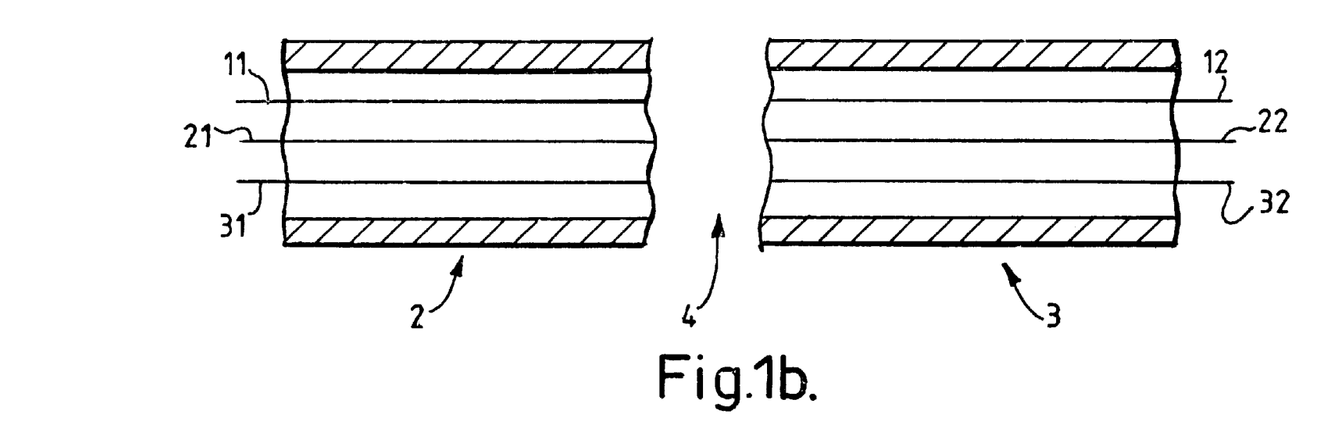
FIG. 1b is a longitudinal cross section of the fiber optic cable of FIG. 1a after it has been broken into two parts.

A length of fiber optic cable has a plurality of individual fibers, each fiber extending throughout the length of the cable. FIG. 1a is a longitudinal cross section of a fiber optic cable having 3 fibers. The cable 1 has an outer coating 5 and a three fibers: an upper fiber 10, a middle fiber 20 and a lower fiber 30. FIG. 1b shows the same cable after it has been broken in two. There are now two lengths 2 and 3 of broken cable separated by a break 4. Each of the fibers 10, 20, 30 has also been broken in two so that there are now six individual broken fibers 11, 12, 21, 22, 31 and 32. The upper fiber 10 has been broken into two fibers 11 and 21, one of these fibers 11 belonging to the broken length of cable 2 on the left of the break and one fibers 21 belonging to the broken length of cable 3 on the right of the break.

Similarly the middle fiber 20 has been broken into two fibers 21 and 22, one of these fibers 21 belonging to the broken length of cable 2 on the left of the break and one of the fibers 22 belonging to the broken length of cable 3 on the right of the break. Similarly the lower fiber 30 has been broken into two fibers 31 and 32, one of these fibers 31 belonging to the broken length of cable 2 on the left of the break and one of the fibers 32 belonging to the broken length of cable 3 on the right of the break.

In order to repair the cable the broken lengths 2 and 3 need to be reconnected and in particular the fibers on the left of the break 11, 21, 31 need to be reconnected to the fibers on the right of the break 12, 22, 32. The fibers need to be reconnected correctly so that each fiber on the left of the break is connected to the corresponding fiber on the right of the break. The corresponding fibers being those which were originally part of the same unbroken fiber. For example the upper fiber 10 was broken into two fibers: fiber 11 on the left of the break and fiber 12 on the right of the break. These two fibers need to be reconnected to each other and not to any of the other fibers. Similarly fiber 21 needs to be connected to fiber 22 and fiber 31 needs to be connected to fiber 32.

Figure 1C:
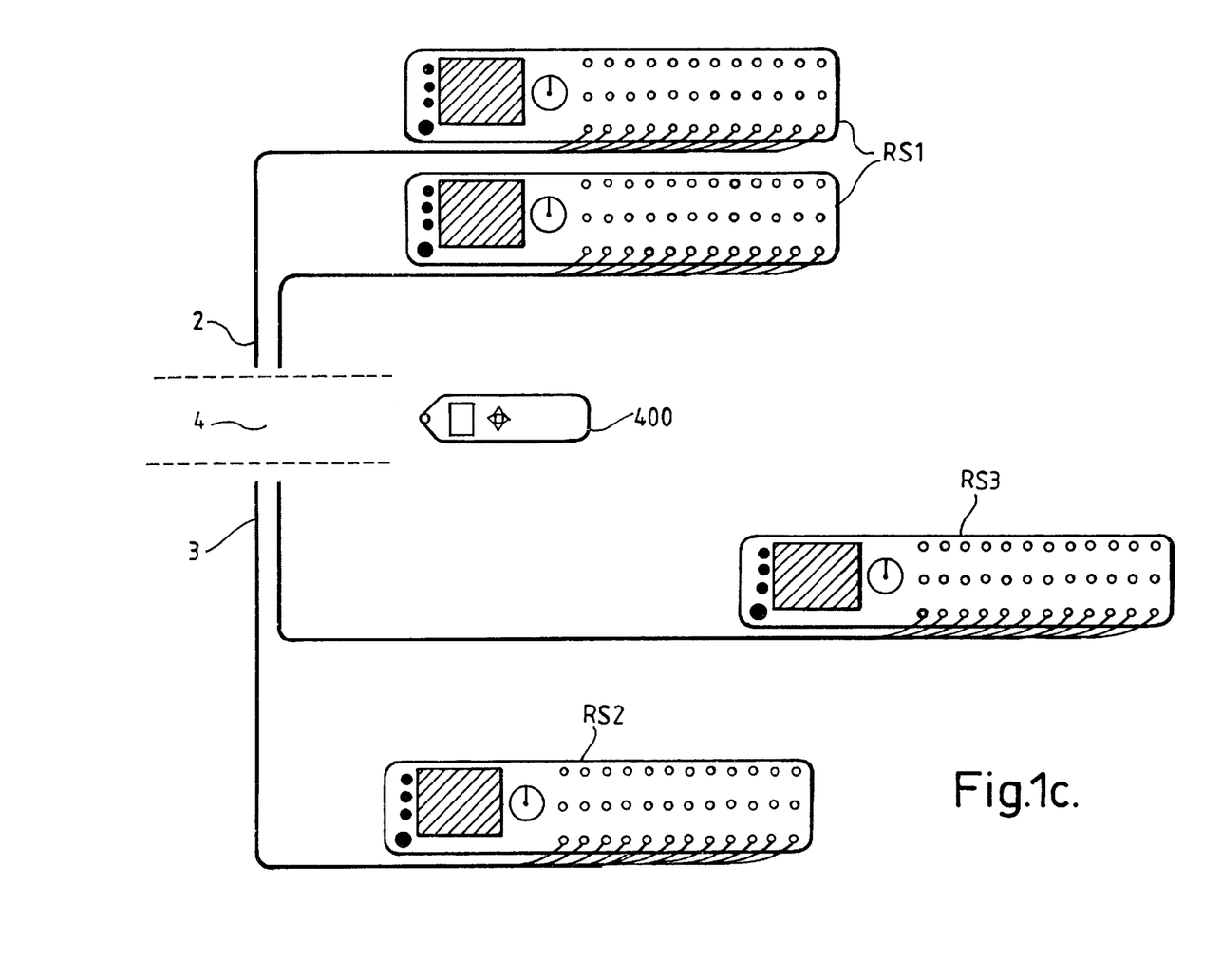
FIG. 1c is a schematic diagram of a fiber optic system in which the present invention may be used.

A typical set-up of part of a fiber optic system is shown in FIG. 1c. A fiber optic cable 2, 3 carries fibers (72 in this example) from one regeneration station RS1 to further regeneration stations RS2, RS3, which may have different locations, and a break 4 has occurred on this cable. A receiving device 400 allows the broken fibers to be identified, matched to the corresponding fibers on the other side of the break and reconnected.

Fiber optic cables typically have many fibers (certainly far more than 3), each of which looks identical, so matching and reconnecting the corresponding fibers in a broken cable is a difficult and time consuming job.

Therefore it is necessary to identify and match the corresponding fibers as will now be described. A transmitting device (not shown) capable of connection to a plurality of fibers is connected to fibers 11, 21 and 31 in the first length of broken cable and used to transmit a different optical signal simultaneously down each fiber. The transmitting device is connected to, or placed in sufficiently close proximity that the signals can be accurately passed to, the ends of the fibers 11, 21 and 31 at the non broken end of the first length 2 of broken fiber optic cable and the optical signals are transmitted towards the break 4. Each optical signal is an amplitude modulated laser beam and each optical signal has a different modulation waveform and so is distinguishable from the other optical signals.

A receiving device (400 in FIG. 1c) is used to detect the optical signals emerging from the fibers at the break 4. The receiving device can be connected to, or placed in sufficiently close proximity that the signals can be accurately received from, one or more fiber ends at the break and detects the presence of any optical signal in each of those fibers. It analyses the modulation waveform of the detected optical signals in order to identify each fiber.

Similarly, optical signals are transmitted down the fibers 12, 22, 32 in the second length of broken cable 3. A transmitting device (which may be the same or different to that used in the first length) is connected to, or placed in sufficiently close proximity that the signals can be accurately passed to, the unbroken fiber ends at the unbroken end of the second length 3 of broken fiber optic cable and transmits a different optical signal into each fiber to which it is applied. The optical signals are transmitted towards the break 4. Each optical signal is an amplitude modulated laser beam and the optical signal transmitted into each fiber has a different modulation waveform and so is distinguishable from the other optical signals transmitted into the second broken length of fiber optic cable. However the modulation waveform of each optical signal transmitted into each fiber in second length of optical cable is chosen so that it is the same as the modulation waveform of the signal transmitted into the corresponding fiber in the first broken length of fiber optic cable. Hence the modulation waveform of the signal transmitted into fiber 11 is the same as the modulation waveform of the signal transmitted into fiber 12. Likewise the signals transmitted into fibers 21 and 22 have like modulation waveforms as do the signals transmitted into fibers 31 and 32. The receiving device is then used to match the fiber ends at which optical signals with like modulation waveforms are detected. In this way the ends of corresponding fibers are identified at the break and can be reconnected.

Generally a fiber optic cable will extend between two regeneration stations, as shown in FIG. 1c, and usually a break will occur at a point in the cable between regeneration stations, usually some distance from either station. Therefore it is envisaged that a first transmitting device will be applied to fiber ends at a first regeneration station RS1 and a second transmitting device will be applied to fiber ends at a second regeneration station RS2 or RS3 and that a human operator will use the same receiving device 400 to match the corresponding fiber ends at the break.

The above example was for a fiber optic cable having just three fibers, in practice fiber optic cables have a much larger number of fibers. It is envisaged that each transmitting device will be capable of being connected to, or placed in sufficiently close proximity that the signals can be accurately passed to, a plurality of fibers and that if necessary more than one transmitting device could be used at each regeneration station to ensure that a signal was transmitted down each fiber. For example a transmitting device might be capable of being applied to 36 fibers simultaneously and of generating 256 different optical signals (each signal being modulated by a different waveform). It would then be possible to select 36 signals from this bank of 256 signals. If several transmitters were being used at each regeneration station it would be desirable to choose a different set of 36 signals to be transmitted by each transmitter in order that a different signal is sent down each fiber.

All of the signals transmitted by a transmitting device need to be distinguishable from each other. Each signal is a modulated laser beam and each signal is differentiated from the other signals by having a different modulation waveform. An ideal solution would be for each modulation waveform to be a pure tone, a different frequency being used for each waveform. The detection device could then decode each signal by taking a number of samples of the waveform received and performing a Fourier Transform on that set of samples in order to determine the frequency of the waveform. However in order for the detection device to be fast in analysing the signals, it is necessary to make efficient use of the Fourier Transform. In order to get maximum use of the computations of the Fourier Transform the frequencies of the waveforms transmitted by the transmitting device should be sequential members of an arithmetic progression. That is the frequencies should be the sequence 1, 2, 3, 4, 5, 6, 7, 8 etc multiplied by some constant.

This sequence of tones is difficult to produce by integer sub-division of a master clock. For example the sequence of frequencies 1, 2, 3, 4, 5 can only be produced by sub dividing 60 (1=60/60, 2=60/30, 3=60/20, 4=60/15 and 5=60/12), there is no smaller number that will satisfy this condition. In fact to reproduce the sequence of frequencies 1, 2, 3, 4, 5 Hz a clock of at least 120 Hz is required. A 120 Hz clock rather than a 60 Hz clock is required because whilst a 60 Hz clock could be subdivided correctly a 60 Hz clock is not quick enough to do this twice every second and there would only be enough subdivisions for a half cycle of the desired sequence of frequencies (the sequence of frequencies 0.5, 1, 1.5, 2, 2.5 Hz could be reproduced by a 60 Hz clock).

Figure 2:
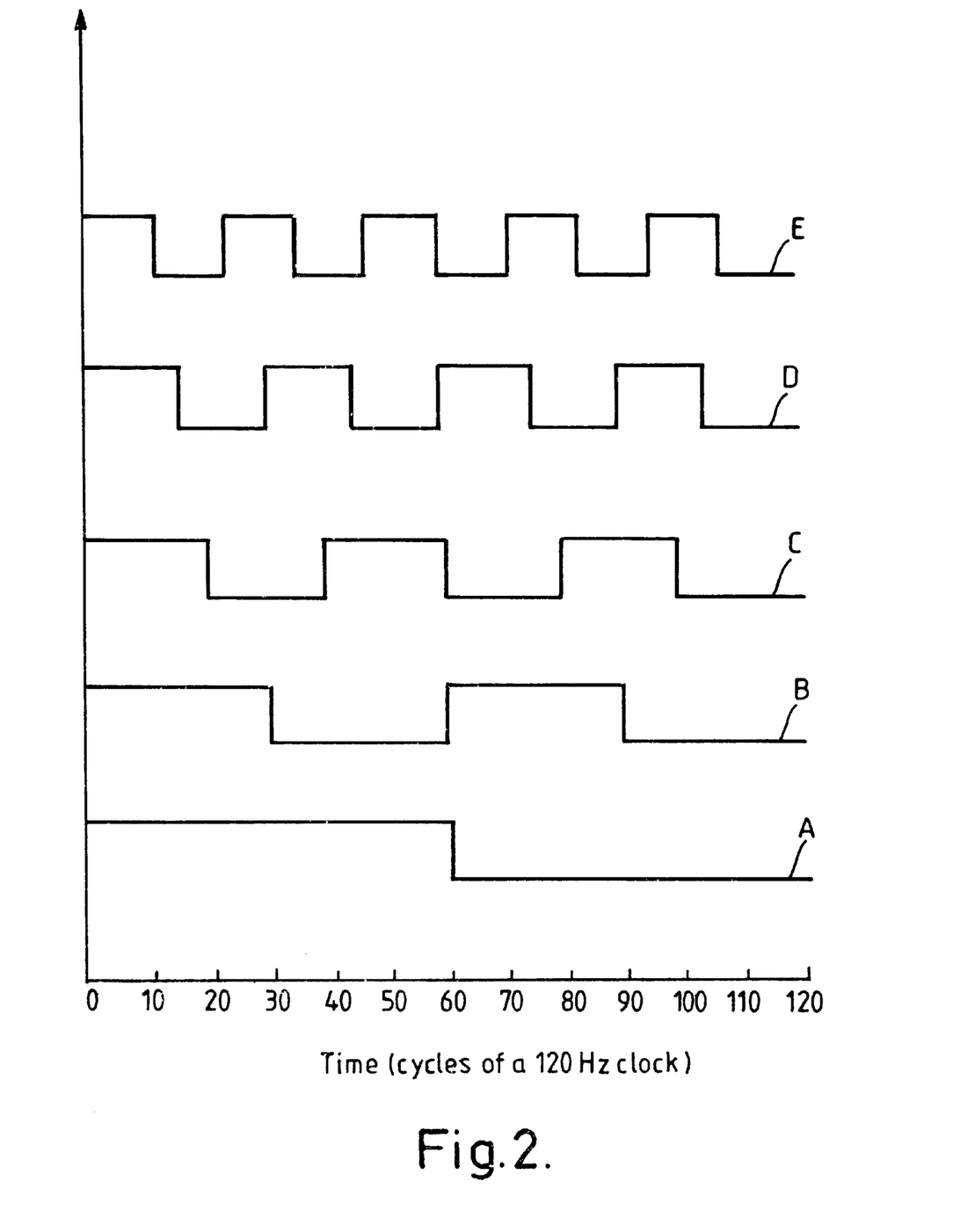
FIG. 2 is a graph showing waveforms of frequency 1, 2, 3, 4 and 5 Hz which have been generated by subdivision of 120 cycles of a 120 Hz clock.

FIG. 2 is a graph showing the sub division of 120 cycles (1 second) of a 120 Hz clock into frequencies 1, 2, 3, 4 and 5 Hz. The x axis represents time (in clock cycles) and the y axis represents a nominal pulse height. The 1, 2, 3, 4 and 5 Hz frequencies are offset from each other along the y axis of the graph so that each can be seen clearly. The 1 Hz frequency (A) is provided by a pulse train in which each pulse has a duration of 60 cycles and in which a new pulse is generated every 120 cycles. The 2 Hz frequency (B) is provided by a pulse train in which each pulse has a duration of 30 cycles and in which a new pulse is generated every 60 cycles. The 3 Hz frequency (C) is provided by a pulse train in which each pulse has a duration of 20 cycles and in which a new pulse is generated every 40 cycles. The 4 Hz frequency (D) is provided by a pulse train in which each pulse has a duration of 15 cycles and in which a new pulse is generated every 30 cycles. The 5 Hz frequency (E) is provided by a pulse train in which each pulse has a duration of 12 cycles and in which a new pulse is generated every 24 cycles.

A transmitting device capable of producing 256 different tones would require a very fast and impractical clock rate. In the above example each waveform had a constant 50/50 mark space ratio. That is the length of each pulse was equal to the length of the pulse gap following it. Lower frequency master clock rates can be used if the waveforms are allowed to not have a 50/50 mark space ratio. However waveforms produced in this manner are not pure tones and generally contain harmonics both above and below the frequency being generated. These harmonics tend to produce spurious responses from the detection device.

Unlike the pure tones which they approximate, these waveforms do not have a 50/50 mark space ratio due to a time jitter at the rising and falling pulse edges. This is a consequence of using the lower clock rate. If the time jitter itself is periodic then the waveform will repeat itself over a certain repeat period. If each waveform has a common repeat period and if it is ensured that over this repeat period each waveform undergoes the same number of wave cycles as the waveform which it approximates then the waveforms may be useable. One complete wave cycle is defined as from the start of one pulse to the start of the next pulse).

If the time jitter is small so that the rising and falling edges of the waveforms are close to the 50/50 mark space ratio then if the sample rate of the detection system is chosen correctly, the deviation from the 50/50 mark space ratio will not be detected and the effect will be to remove the spurious harmonics as far as the detection system is concerned. The detection system can then sample each waveform over the repeat period of the waveform, or a multiple thereof and carry out a Fourier transform on the set of samples taken.

Figure 3A:
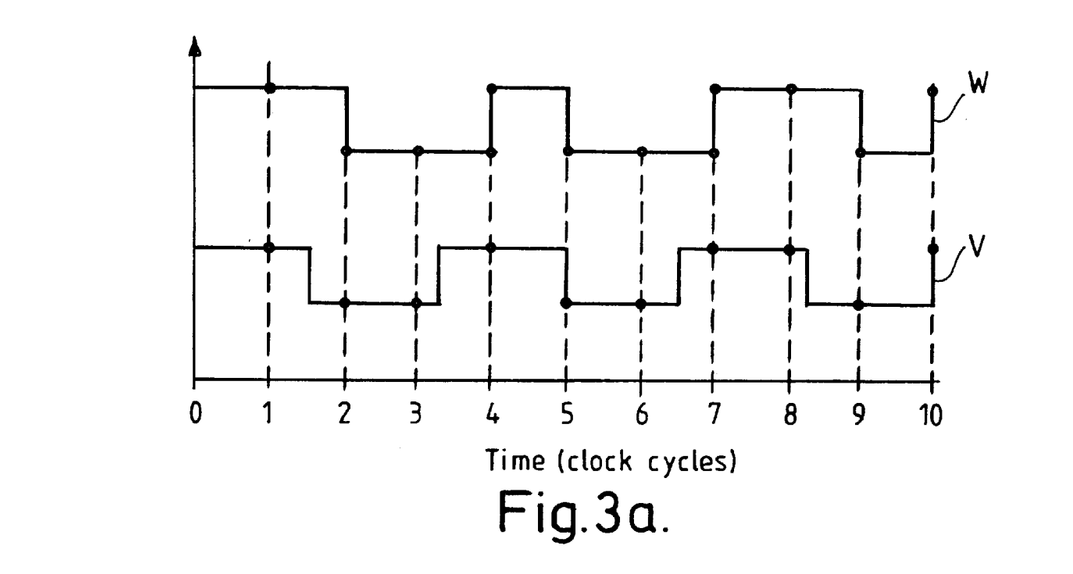
FIG. 3a is a diagram showing a waveform approximating a pure tone and the pure tone, which it approximates.

FIG. 3a shows a waveform W, of the type described above, which approximates a pure tone V. The pure tone V is shown below the waveform W. The vertical direction indicates nominal pulse height and the horizontal direction indicates time (in clock cycles). A sample is taken at each clock cycle and this is shown by the dashed vertical lines at each clock cycle. Each point sampled is shown by a dot, where the dashed lines intersect the waveform or the pure tone. It can be seen at each sample point the state of the waveform W is the same as the state of the pure tone V that it approximates. Therefore a detection system sampling at the sample points shown in FIG. 3a would detect no difference between waveform W and the pure tone V.

The generation of such waveforms will now be described. First a master clock is used to establish a clock cycle. A repeat period for the waveforms is then defined. The repeat period is defined to be equal to 2Y clock cycles, where Y is an integer and is the same for each waveform. The waveforms are generated as a rectangular pulse so each waveform has two states: a high state and a low state. Each waveform is initially set in the high state. X modulus Y is then counted at each clock cycle for each waveform and the state of the waveform is changed every time Y is reached or exceeded. A different number X is chosen for each waveform, in each case the number X must be an integer which is less than Y. The set of integers chosen to generate the waveforms must form an arithmetic progression (e.g. 1, 2, 3, 4, 5 . . . ) in order that the frequencies of the approximate pure tones form an arithmetic progression.

Counting X modulus Y is a counting process in which the result for each counting step is calculated by multiplying X by the step no (this calculation to be carried out in base Y) and taking the least significant digit of the result. Alternatively the multiplication can be carried out in any base, the product divided by Y and the remainder taken. For example counting 6 modulus 10 will obtain the sequence 0, 6, 2, 8, 4, 0, 6, 2, 8, 4, 0 etc, these numbers being the least significant digits of the 6 times table in base 10 or the remainder when 0, 6, 12, 18, 24 etc. is divided by 10.

Another way of looking at counting X modulus Y is that it has a value Z at each step. At the zeroth step (ie when the clock is first started) this value Z is set to 0. After that X is added at each step and the result is the new value of Z for that step. The exception being that for steps where adding X has resulted in a value of Z which is greater than or equal to Y, then Y must be subtracted to give a value Z for that step which less than Y (for 6 modulus 10 this first happens at the $2^{nd}$ step because 0+6+6=12>10 and the result is 12−10=2). The state of the waveform is changed each time Y is reached or exceeded in this manner.

The method and the waveform, which it generates, are perhaps best understood by way of example. As the method is much easier to understand with lower numbers, we continue with the example of a waveform generated by counting 6 modulus 10.

Figure 3B:
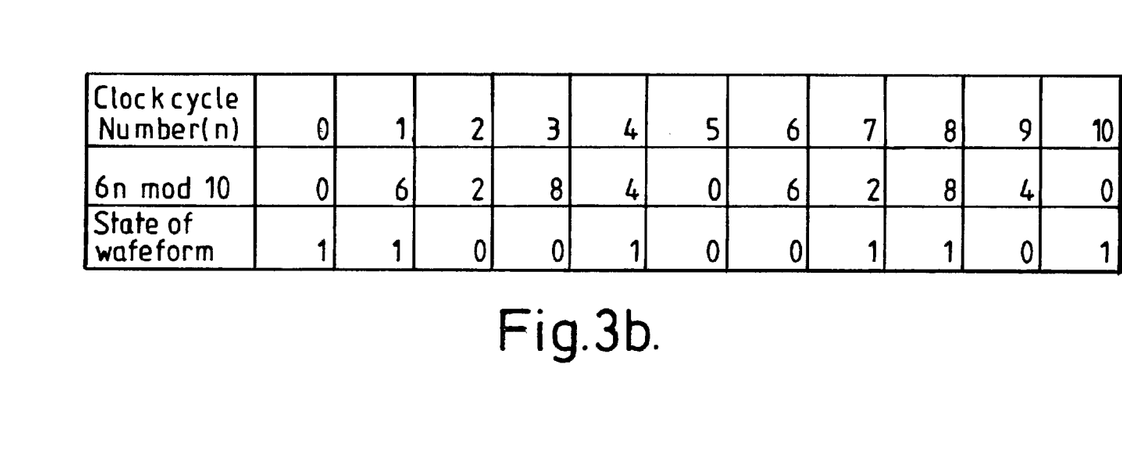
FIG. 3b is a table showing the steps in generating a waveform by counting 6 modulus 10.

FIG. 3b shows a table containing the values reached by counting 6 modulus 10 at clock cycles 0 (ie when the clock is started) to 10. The first row of the table contains the number of the clock cycle for each column. The second row of the table lists the values reached by counting 6 modulus 10 at each clock cycle. The second row is labelled 6n modulus 10 as this is the mathematical expression giving the result for the nth clock cycle. The third row of the table contains the state of the waveform at each clock cycle. The state is given in binary form with 1 indicating a high state and 0 indicating a low state. The waveform is started in a high state at the zeroth clock cycle.

Referring back to FIG. 3a, the waveform W is generated by counting 6 modulus 10 at each clock cycle shown on the x axis. The clock cycles shown on the x axis are those of the clock used to regulate the wave generation process.

There are several points to note from the graph in FIG. 3a. The first point to note is that over the 10 clock cycles shown both the waveform and the pure tone undergo the same number of wave cycles (one complete wave cycle being defined as from the start of one pulse to the start of the next pulse). In general a waveform generated by counting X modulus Y at each clock cycle will have X changes of state (and therefore X/2 wave cycles) in Y clock cycles. Therefore the frequency approximated by such a waveform is the clock frequency multiplied by X and divided by 2Y.

The second point to note is that the waveform W will repeat itself every 10 clock cycles. This can be seen because at the $10^{th}$ clock cycle it is in the same state (the high state) as when it started at the >zeroth=clock cycle and from the table in FIG. 3a the counting X modulus Y has reached the same value (0) as when it started and so will repeat itself from this point. In general the repeat period for a waveform generated by counting X modulus Y, is 2Y clock cycles. For some waveforms (such as that generated by 6 modulus 10), it is less than 2Y clock cycles, but all waveforms generated in this manner will repeat themselves every 2Y clock cycles (for example waveforms generated by counting 7 modulus 10 or 9 modulus 10 repeat themselves once every 20 clock cycles, whilst a waveform generated by counting 5 modulus 10 will repeat itself once every 4 clock cycles and 5 times every 20 clock cycles).

Therefore every waveform generated in this manner will have the same number of wave cycles in its repeat period (2Y clock cycles), as the pure tone which it approximates. It is desirable for the receiving device to carry out the Fourier Transform on a set of samples taken over the common repeat period (2Y clock cycles) of the waveforms, or a multiple of this period, because over this period each waveform will undergo an integer number of wave cycles.

The third point to note is that if the waveform W is sampled at each cycle of the generating clock (e.g. if a sampling clock of the same frequency and in sync with the generating clock is used by the detection device) then the samples will return the same value for W as they would for the pure tone V. This is because the width of the pulse jitter (the difference between the location of the edges of the pulses in the W waveform and the edges in the pure tone V) is sufficiently small not to be detected by the detection system at that sample rate.

This method of waveform generation is particularly easy to implement with a computer or suitably configured electronic circuit. Each waveform is generated by adding the integer X to an accumulator of size Y at each clock cycle. The accumulator is monitored to see if it rolls over (ie to see if an overflow is registered) and if it does the state of the waveform is changed. For a practical system Y must be a power of 2 (as accumulators have sizes which are powers of 2). It is envisaged that a field programmable gate array (FPGA) will be used to carry out the maths for all the waveforms at once.

The above example of 6 modulus 10 used low numbers for X and Y, in practice it may well be desirable to use larger numbers. The larger the ratio of Y to X the more closely the waveform will approximate a pure tone having a 50/50 mark space ratio.

Figure 4:
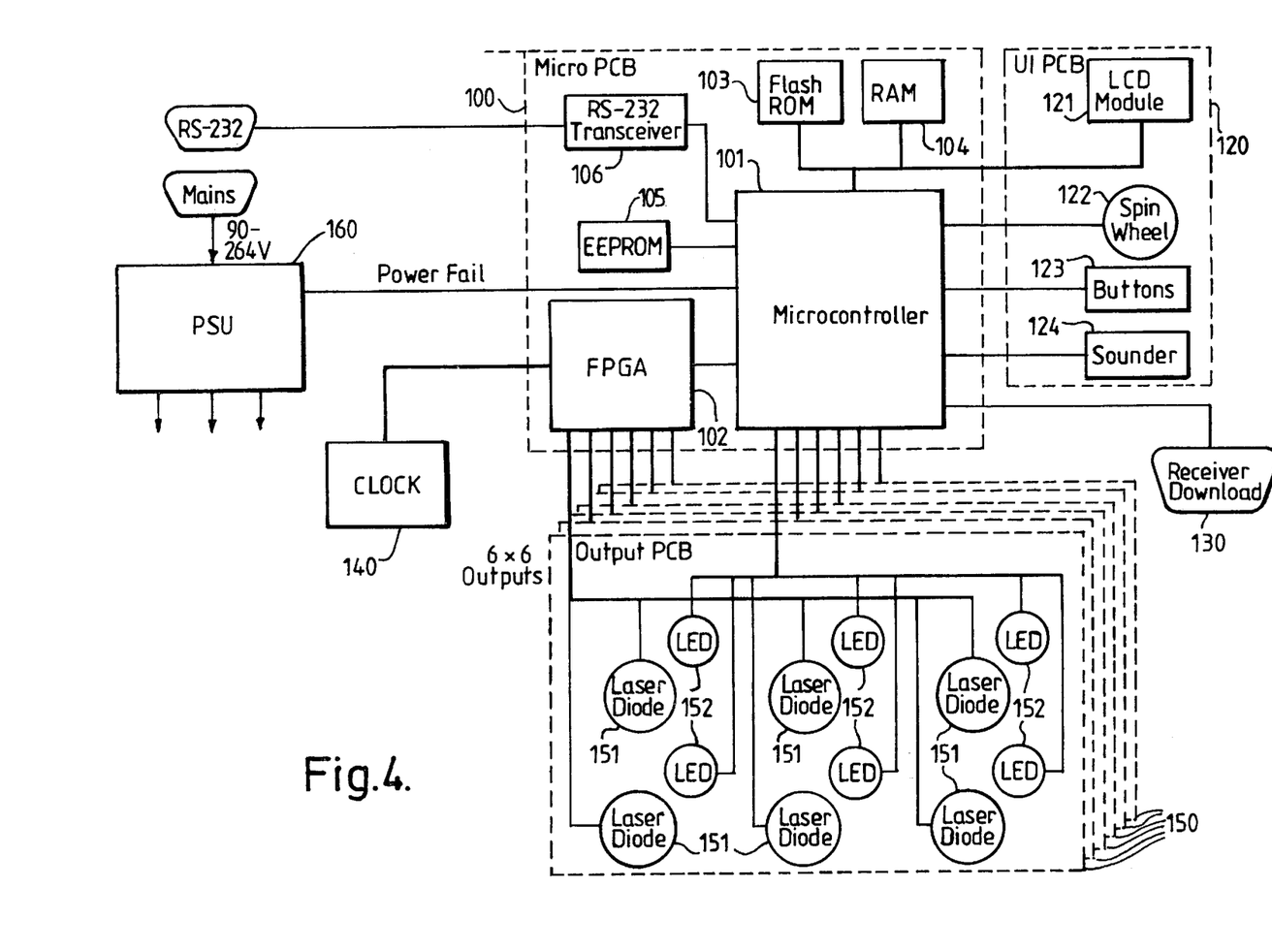
FIG. 4 is a function block diagram of a transmitter for generating waveforms of the type shown in FIG. 3a and applying them to optical fibers.

A transmitting device is thus needed and a function block diagram of it is shown in FIG. 4. The device uses, for example, a 12.288 MHz clock 140, which may be separate from, or internal to, the FPGA 102. The device in this case is capable of generating 256 different waveforms. The device is also capable of being applied to 36 fibers at once, with 6 output PCBs 150, each having 6 laser diodes 151 and 6 indicator LEDs 152, and is capable of sending a signal with a different waveform down each fiber. The device is capable of generating 256 different signals and 36 of these are chosen, one to be sent down each fiber to which it is applied. The device is capable of generating 256 different modulation waveforms and each output signal is a modulated laser beam. Each waveform is generated by the method of counting X modulus Y described above.

The value of Y used by the device is 131072 clock cycles and the numbers 256 to 511 are chosen as the values of X. The device generates each waveform by adding the chosen number for that waveform (one of the values 256 to 511) to an accumulator of size 131072 (ie 17 bits) each cycle of the 12.288 MHz clock 140 and changes the state of the waveform each time the accumulator rolls over. An FPGA 102 carries out the maths for each of the 36 waveforms (chosen from the 256 possible waveforms) which are generated simultaneously.

A microcontroller 101, mounted on control PCB 100, interfaces with the FPGA 102 to control, in particular, which 36 waveforms are chosen, and also controls the output of the indicator LEDs 152. Other components on the control PCB 100 include flash ROM 103, RAM 104, EEPROM 105 and RS-232 transceiver 106, all of which provide input/output means for the microcontroller 101. A port 130 for transferring information to and from the receiving device 400 is also provided. User interface 120 includes input devices such as buttons 123 and a spin wheel 122 and output devices such as an LCD module 121 and a sounder 124, all of which interface with microcontroller 101. Power for the transmitter comes from a mains supply via a power supply unit 160.

Figure 5:
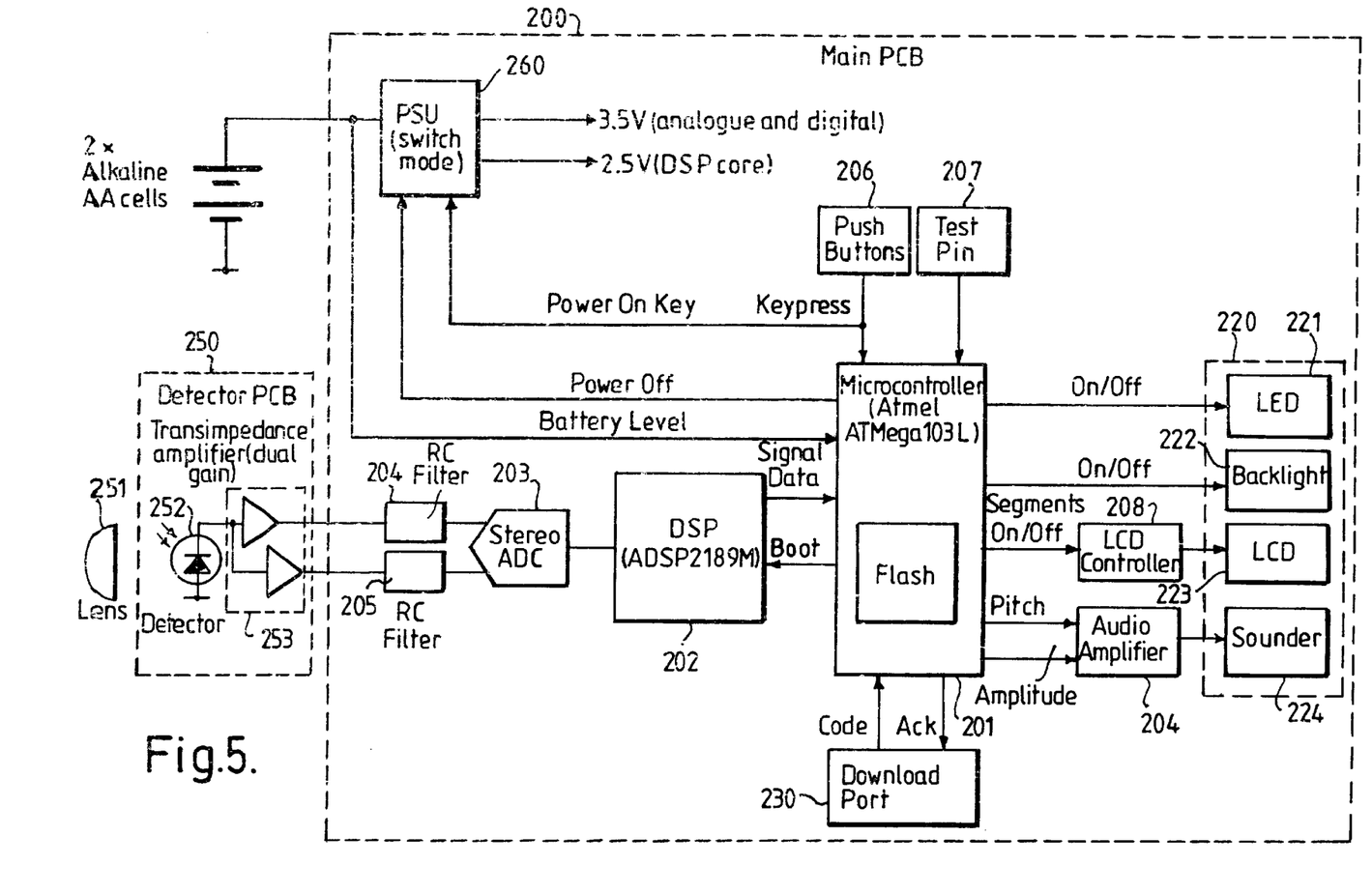
FIG. 5 is a function block diagram of a receiver for analysing the waveforms generated by the transmitter of FIG. 4 to identify respective fibers.

A receiving device 400 for receiving and detecting the signals transmitted by this transmitting device is also needed, and a function block diagram of it is shown in FIG. 5. The receiving device is capable of connection to one or more fibers and of receiving and analysing signals from each fiber to which it is applied. Signals are focussed by lens 251 and sensed by the detector 252 mounted on detector PCB 250. They then pass through dual gain transimpedance amplifier 253 and RC filters 204 and 205. The receiving device samples each received signal at 48 KHz, using a sigma-delta stereo ADC 203. The receiving device analyses each received signal by carrying out a FFT on a block of 1024 samples of that signal in digital signal processor 202 (which is, for example, an ADSP 2189M) and microcontroller 201 (which is, for example, an Atmel ATMega103L). As the high frequency harmonics have been greatly reduced by the above procedure and the tones approximated by each signal lie exactly on the frequency bins of the FFT, a rectangular window may be used with there being virtually no leakage into adjacent frequency bins. Each fiber can then be identified on the basis of the signal it carries.

The main PCB 200 of the receiving device houses microcontroller 201, DSP 202, ADC 203, RC filters 204 and 205. It also has input means for the controller, including push buttons (such as an on/off switch) 206 and test pin 207 and output device controllers for an LCD 208 and audio 209. User interface 220 may be separately mounted and comprises LED(s) 221, backlight 222, LCD 223 and sounder 224. The receiving device can interface with the transmitting device through download port 230 which can be connected to the corresponding port 130 of the transmitting device. Power is supplied by batteries or similar portable power supply means, in this case two alkaline AA cells, which supply power supply unit 260. The battery level is monitored by microcontroller 201, and a low battery level can be indicated on user interface 220.

What is claimed:

1. A method of identifying the fibers of a fiber optic cable, comprising:
   inputting a set of signals at one end of the fiber optic cable to the fibers of said fiber optic cable; and
   detecting the signals at another end of the fiber optic cable;
   wherein each signal of the set of signals has a different waveform, and is an input to a respectively different fiber, whereby each fiber has an input signal of a different waveform from the other fibers in the cable, wherein each waveform has a plurality of states and an integer X associated therewith, X being different for each waveform and the integers X forming a set of integers $X_n$,
   wherein the waveforms are generated by:
      establishing a generating clock cycle at a generating rate;
      defining a repeat period for the waveforms, the repeat period being equal to 2Y cycles of the clock and being the same for each waveform, Y being an integer greater than the highest integer of the set of integers $X_n$;
      counting X mod Y for each waveform at each clock cycle and changing the state of the waveform each time Y is reached or exceeded by said counting.

2. A method according to claim 1, wherein the signals are detected by:
   establishing a sampling clock cycle at a sampling rate;
   taking a series of samples of each signal, each sample being taken on a cycle of the sampling clock;
   performing a Fourier Transform on the series of samples;
   wherein the sampling rate is chosen so that the signals are detected as having a frequency, each signal being detected as having a different frequency from the other signals.

3. A method according to claim 2, wherein the sampling rate is the same as or a subdivision of the generating rate.

4. A method according to claim 1, wherein the set of integers $X_n$ is composed of members of an arithmetic progression.

5. A method according to claim 1, wherein each waveform has only two states.

6. The method according to claim 1, wherein each signal is a laser beam modulated by the required waveform.

7. The method according to claim 1, wherein the signals are for successive inputting to the respective fibers of a fiber optic cable.

8. The method according to claim 1, wherein the signals are for simultaneous inputting to the respective fibers of a fiber optic cable.

9. A method of identifying the fibers of a fiber optic cable, comprising:
   inputting a set of signals at one end of the fiber optic cable to the fibers of said fiber optic cable; and
   detecting the signals at another end of the fiber optic cable;
   wherein each signal of the set of signals has a different waveform, and is an input to a respectively different fiber, whereby each fiber has an input signal of a different waveform from the other fibers in the cable,
   wherein the waveforms are generated by:
      establishing a generating clock cycle at a generating frequency; and
      dividing the generating frequency by a set of integers; and
   wherein a waveform with a different frequency is generated for each integer division of the generating clock, each waveform being a pure tone.

10. A method according to claim 9, wherein the waveforms are generated with frequencies in arithmetic progression.

11. A method of generating waveforms for modulating physical signals, each waveform having an integer X associated therewith, X being different for each waveform, and the integers X forming a set of integers $X_n$, the set of integers $X_n$ being composed of members of an arithmetic progression, comprising:
   establishing a clock cycle;
   defining a repeat period for the waveforms, the repeat period being equal to 2Y cycles of the clock and being the same for each waveform, Y being an integer greater than the highest integer of the set of integers $X_n$;
   counting X mod Y for each waveform at each clock cycle and changing the state of the waveform each time Y is reached or exceeded by said counting.

12. An apparatus for identifying the fibers of a fiber optic cable comprising:
   inputting means for inputting a set of signals at one end of the fiber optic cable to the fibers of said fiber optic cable;
   detecting means for detecting the signals at another end of the fiber optic cable, wherein each signal of the set of signals has a different waveform, and is an input to a respectively different fiber, whereby each fiber has an input signal of a different waveform from the other fibers in the cable;
   a generating clock for establishing a generating clock cycle at a generating rate;
   light generating means for generating a plurality of optical signals;
   modulation waveform generating means regulated by the clock for generating a plurality of modulation waveforms, each waveform having a plurality of states and an integer X associated therewith, X being different for each waveform, and the integers X forming a set of integers $X_n$; and
   modulation means for modulating the plurality of optical signals generated by the light generating means with the plurality of modulation waveforms generated by the modulation waveform generating means;
   said waveform-generating means being configured to generate said plurality of waveforms by:
      defining a repeat period for the waveforms, the repeat period being equal to 2Y cycles of the clock and being the same for each waveform, Y being an integer greater than the highest integer of the set of integers $X_n$; and
      counting X mod Y for each waveform at each clock cycle and changing the state of the waveform each time Y is reached or exceeded by said counting.

13. An apparatus according to claim 12, wherein said detecting means comprises:
   a sampling clock for establishing a sampling clock cycle at a sampling rate;

means for receiving a series of samples of each signal, each sample being taken on a cycle of the sampling clock; and means for performing a Fourier Transform on the samples, the sampling rate being chosen so that the signals are detected as having a frequency, each signal being detected as having a different frequency from the other signals.

14. An apparatus according to claim 13, wherein the sampling rate is the same as or a subdivision of the generating rate.

15. An apparatus according to claim 12, wherein the set of integers $X_n$ is composed of members of an arithmetic progression.

16. An apparatus according to claim 12, wherein the waveform generating means has a plurality of adding means, a plurality of accumulators of size Y, a plurality of overflow detecting means, and a plurality of waveform output means for outputting a plurality of waveforms;

each adding means being linked to a respective accumulator and configured to add a given integer X to said accumulator every clock cycle, each adding means adding a different integer X;

each respective accumulator being linked to a respective overflow detecting means, and each respective overflow detecting means being linked to a respective waveform output means.

17. An apparatus according to claim 12, wherein the modulating means is one modulator of changing modulating frequency.

18. An apparatus according to claim 12, wherein the modulating means is a plurality of modulators, each modulator at a different modulating frequency.

19. An apparatus according to claim 12, wherein each waveform has two states.

20. An apparatus for identifying the fibers of a fiber optic cable comprising:

inputting means for inputting a set of signals at one end of the fiber optic cable to the fibers of said fiber optic cable;

detecting means for detecting the signals at another end of the fiber optic cable, wherein each signal of the set of signals has a different waveform, and is an input to a respectively different fiber, whereby each fiber has an input signal of a different waveform from the other fibers in the cable;

a generating clock operating at a generating frequency; and frequency dividing means for dividing the generating frequency by a set of integers, wherein the frequency dividing means is arranged to produce waveforms of different frequencies, each waveform being a pure tone.

21. An apparatus according to claim 20, wherein the waveforms are generated with frequencies in arithmetic progression.

22. An apparatus for identifying the fibers of a fiber optic cable, comprising:

inputting means for inputting a set of signals at one end of the fiber optic cable to the fibers of the fiber optic cable such that the signals may be detected at a second end of the fiber optic cable, wherein each signal of the set of signals has a different waveform, and is an input to a respectively different fiber, whereby each fiber has an input signal of a different waveform from the other fibers in the cable;

a generating clock for establishing a generating clock cycle at a generating rate;

light generating means for generating a plurality of optical signals;

modulation waveform generating means regulated by the clock for generating a plurality of modulation waveforms, each waveform having a plurality of states and an integer X associated therewith, X being different for each waveform, and the integers X forming a set of integers $X_n$; and modulating means for modulating the plurality of optical signals generated by the light generating means with the plurality of modulation waveforms generated by the modulation waveform generating means, said waveform generating means being configured to generate said plurality of waveforms by defining a repeat period for the waveforms, the repeat period being equal to 2Y cycles of the clock and being the same for each waveform Y, being an integer greater then the highest integer of the set of integers $X_n$; and counting X mod Y for each waveform at each clock cycle and changing the state of the waveform each time Y is reached or exceeded by said counting.

23. An apparatus for identifying the fibers of a fiber optic cable, comprising:

a laser to input a set of signals at one end of the fiber optic cable to the fibers of said fiber optic cable;

a detector to detect the signals at another end of the fiber optic cable, wherein the laser is adapted to input a signal of a different waveform into each of the fibers of said fiber optic cable;

a generating clock to establish a generating clock cycle at a generating rate;

a light generator to generate a plurality of optical signals;

a modulation waveform generator regulated by the clock to generate a plurality of modulation waveforms, each waveform having a plurality of states and an integer X associated therewith, X being different for each waveform, and the integers X forming a set of integers $X_n$; and a modulator to modulate the plurality of optical signals generated by the light generator with the plurality of modulation waveforms generated by the modulation waveform generator, said waveform generator being configured to generate said plurality of waveforms by defining a repeat period for the waveforms, the repeat period being equal to 2Y cycles of the clock and being the same for each waveform, Y being an integer greater than the highest integer of the set of integers $X_n$;

counting X mod y for each waveform at each clock cycle and changing the state of the waveform each time Y is reached or exceeded by said counting.

24. An apparatus for identifying the fibers of a fiber optic cable, comprising:

a laser to input a set of signals at one end of the fiber optic cable to the fibers of said fiber optic cable, said signals being detectable at another end of the fiber optic cable, wherein the laser is adapted to input a signal of a different waveform into each of the fibers of said fiber optic cable;

a generating clock to establish a generating clock cycle at a generating rate;

a light generator for generating a plurality of optical signals;

a modulation waveform generator regulated by the clock to generate a plurality of modulation waveforms, each waveform having a plurality of states and an integer X associated therewith, X being different for each waveform, and the integers X forming a set of integers $X_n$; and a modulator to modulate the plurality of optical signals generated by the light generating means with the plurality of modulation waveforms generated by the modulation waveform generator, said waveform generator being configured to generate said plurality of waveforms by defining a repeat period for the waveforms, the repeat period being equal to 2Y cycles of the clock and being the same for each waveform, Y being an integer greater than the highest integer of the set of integers $X_n$; and counting X mod Y for each waveform at each clock cycle and changing the state of the waveform each time Y is reached or exceeded by said counting.

25. An apparatus for identifying the fibers of a fiber optic cable, comprising:

a detector adapted to detect, at one end of the fiber optic cable, signals input at another end of the fiber optic cable, wherein the set of signals detected at said one end of the fiber optic cable are each a different waveform, the waveforms characterized by each waveform having a plurality of states and an integer X associated therewith, X being different for each waveform, and the integers X forming a set of integers $X_n$ and each waveform being generated by:

defining a repeat period for the waveforms, the repeat period being equal to 2Y cycles of the clock and being the same for each waveform, Y being an integer greater than the highest integer of the set of integers $X_n$; and counting X mod Y for each waveform at each clock cycle and changing the state of the waveform each time Y is reached or exceeded by said counting.

26. A method of detecting fiber optic cables, comprising:

successively or simultaneously, inputting a unique set of signals with a transmitter at one end of the fiber optic cable to the fibers of said fiber optic cable, the unique set of signals is produced such that the unique set of signals have an arithmetic progression without integer subdivision of a clock cycle;

detecting the unique set of signals at another end of the fiber optic cable with a detector, the detector comprising a fourier transform; and determining which fiber of the fiber optic cable that the unique set of signals was inputted through an analysis of the unique set of signals, the signal is analyzed by the fourier transform.

* * * * *